Figure 1:
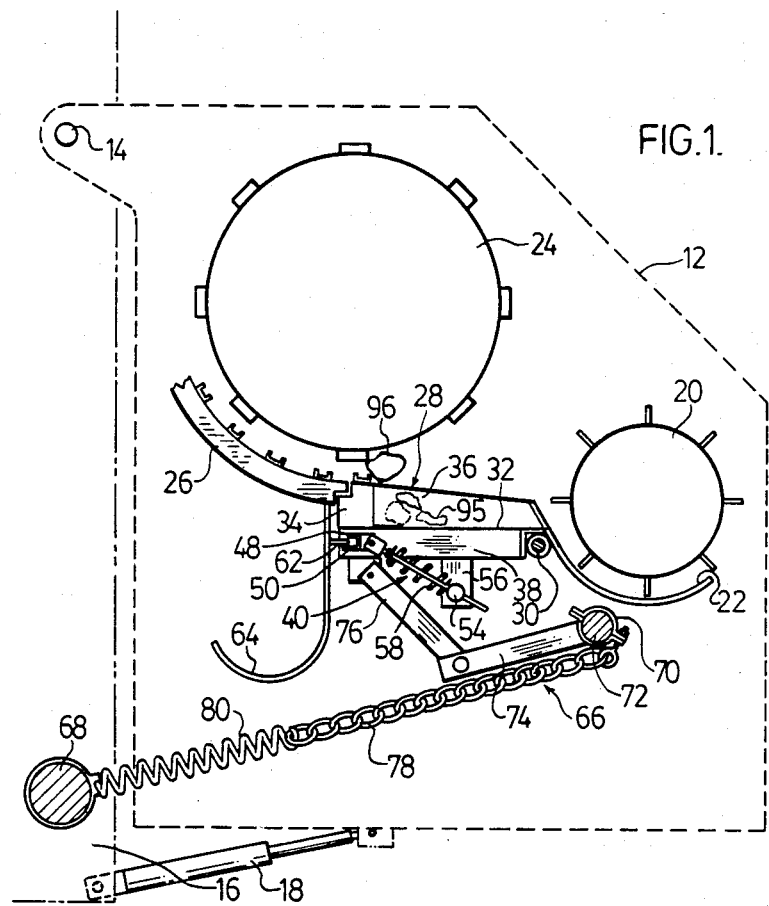

United States Patent [19]

Fortune et al.

[11] Patent Number: 4,538,625
[45] Date of Patent: Sep. 3, 1985

[54] STONE GUARD DOOR FOR HARVESTERS

[75] Inventors: Douglas N. Fortune; Barry R. Ireland, both of Wingham, Canada

[73] Assignee: Soil Mate Equipment Ltd., Wingham, Canada

[21] Appl. No.: 629,876

[22] Filed: Jul. 11, 1984

[51] Int. Cl.³ .............................................. A01F 12/00
[52] U.S. Cl. .................................................. 130/27 JT
[58] Field of Search ......................... 130/27 JT, 27 R; 56/10.2

[56] References Cited

U.S. PATENT DOCUMENTS 3,645,269  2/1972  Peruski ........................... 130/27 JT
4,467,819  8/1984  Musser et al. ................... 130/27 JT Primary Examiner—Jay N. Eskovitz
Attorney, Agent, or Firm—Robert F. Delbridge; Arne I. Fors

[57] ABSTRACT

A harvester has a threshing head pivotally mounted at the front end for raising and lowering movement between a lower operative position and an upper inoperative position. The threshing head comprises a rotatable threshing cylinder, a concave adjacent to and spaced from the threshing cylinder, means for feeding crop along a flow path to the space between the threshing cylinder and the concave, and a stone guard door in the flow path. A latch normally retains the door in a closed position, and is operable by a stone above a predetermined size to cause opening of the door and discharge of the stone from the flow path before the stone enters the space between the threshing cylinder and the concave. Door closing mechanism is connected between the door and the front end of the thresher and is operable by movement of the threshing head to a raised position to effect closing of the door.

6 Claims, 4 Drawing Figures

STONE GUARD DOOR FOR HARVESTERS

This invention relates to harvesters which have a threshing head pivotally mounted at the front end for raising and lowering movement between a lower operative position and an upper inoperative position, the threshing head comprising a rotatable threshing cylinder, a concave adjacent to and spaced from the threshing cylinder, and means for feeding crop along a flow path to the space between the threshing cylinder and the concave.

Because stones may be entrained in crop being fed along the flow path may damage the threshing head and/or concave, a stone guard door is usually provided in the flow path. The door is normally held in a closed position by a latch and is openable by a stone above a predetermined size to cause discharge of the stone from the flow path through the open doorway before the stone enters the space between the threshing cylinder and the concave.

Various door opening and closing mechanisms have been provided in the past to effect the required operation of the door. However, such known mechanisms are not particularly satisfactory in practice because they are unduly complicated and/or require an operator to stop forward movement of the harverster, raise the head and crawl under the head to reclose the door. Such an operation is of course time consuming as well as dangerous.

It is therefore an object of the invention to provide an improved door reclosing mechanism.

According to the invention, stone guard door closing means is connected between the door and the front end of the thresher and is operable by movement of the threshing head to a raised position to effect closing movement of the door.

Thus, if the stone guard door is opened by a stone or for some other reason as sometimes happens, the operator simply needs only to stop the harvester and operate the head raising mechanism. In accordance with the invention, the stone guard door closing means is thereby operated to effet closing of the stone guard door. The operator does not have to leave the cab, thus saving time and without there being any danger to the safety of the operator.

The door closing means may comprise spring means tensioned by initial raising movement of the threshing heads, and catch means operable to prevent closing movement of the door during initial raising movement of the head and released by raising movement of the threshing head beyond an initial raised position to cause the door to be shut by energy provided by said tensioned spring means.

The door latch means may comprise a pivoted latch member retainable by a latch spring in locking and unlocking positions and movable from one position through a centre location to the other position by application of a predetermined force to the door in an opening or closing direction when the door is closed or nearly closed respectively.

Advantageously, the door is recessed below the flow path so as to hold a number of smaller stones without the door being opened.

Figure 2:
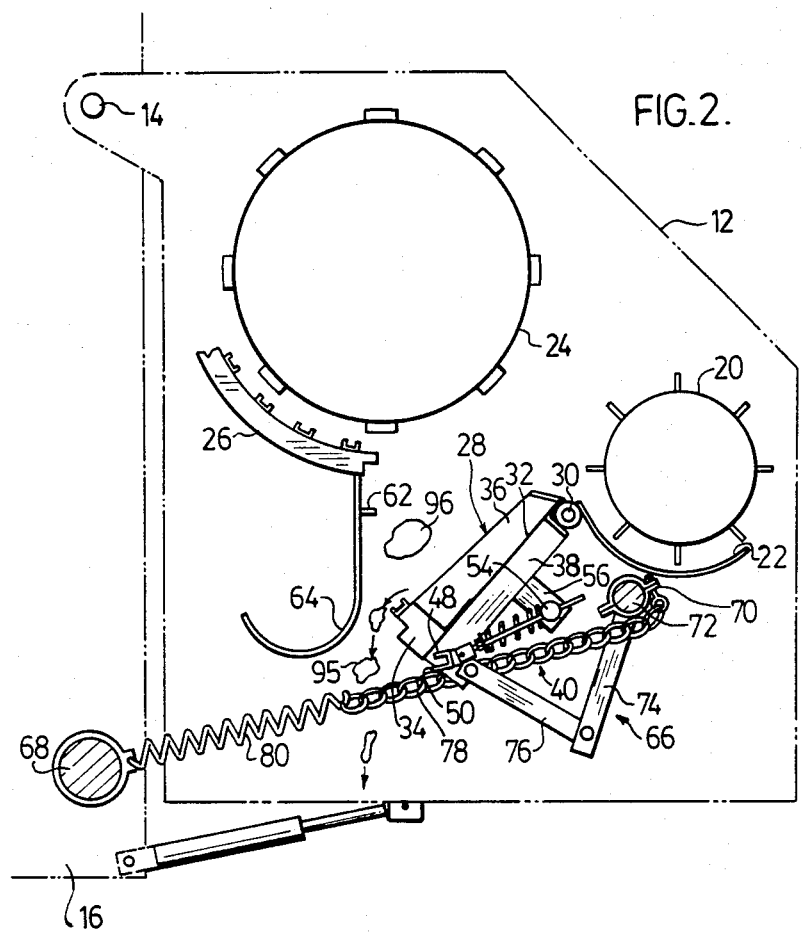
Figure 3:
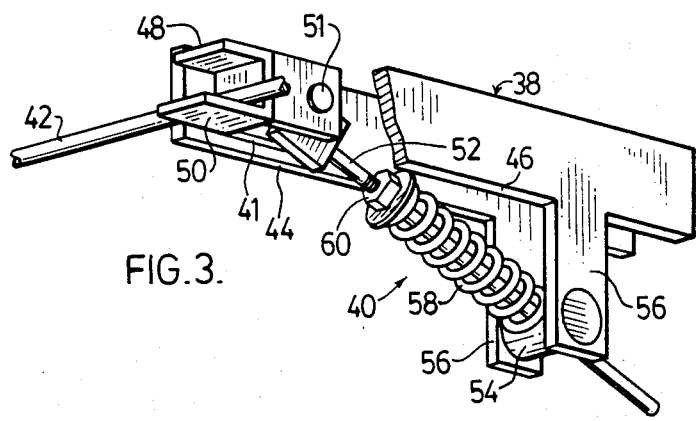
Figure 4:
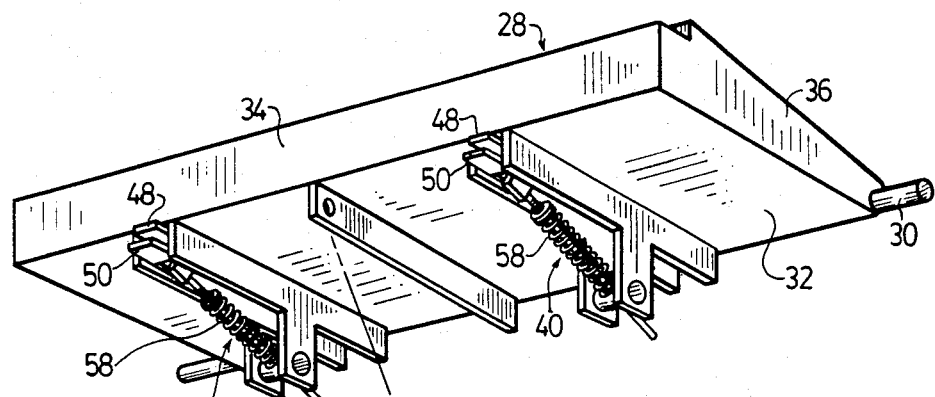
Figure 4:
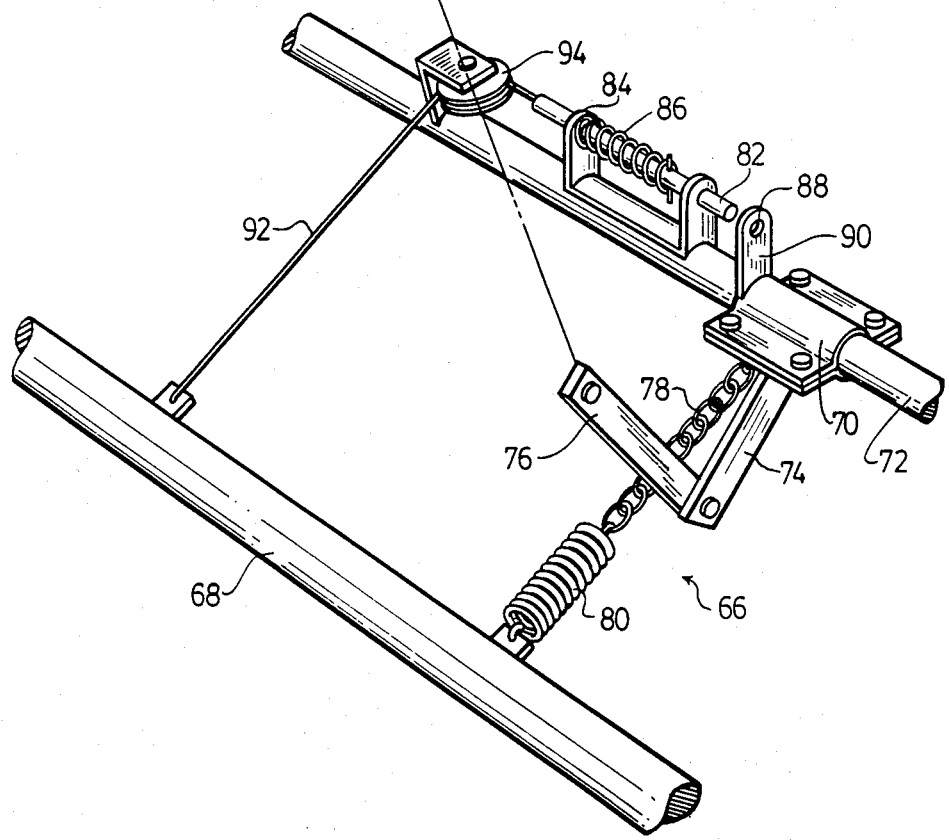

One embodiment of the invention will now be described by way of example, with reference to the accompanying drawings, of which:

FIG. 1 is a diagrammatic side view of a threshing head pivotally mounted on the front end of a harvester with the stone guard door in the closed position, FIG. 2 is a similar view showing the stone guard door opened by a large stone, FIG. 3 is a perspective view of a door latch means, and FIG. 4 is a perspective view of the door closing means.

Referring to the drawings, a harvester has a threshing head 12 pivotally mounted on a shaft 14 at the front end of the main body 16 of the harvester. The threshing head 12 is movable between a lower operative position (as shown in FIGS. 1 and 2), and an upper inoperative position by any suitable mechanism such as a hydraulic piston and cylinder assembly 18 connected between the thresher 12 and the main body 16 of the harvester, as is well known in the art.

The threshing head 12 has a cylindrical rotatable feeder 20 mounted above a flow path member 22 and operable in known manner to receive crop from a header auger (not shown) and feed the crop along a feed path to the space between a rotatable threshing cylinder 24 and a concave 26. A stone guard door 28 is located in the flow path between the feeder 20 and the cylinder 24.

The door 28 is pivotally mounted at its front end on a transverse shaft 30 adjacent the rear end of the flow path member 22. The door 28 has a recessed structure with a bottom 32, a rear wall 34 which extends upwardly from the bottom 32 along its rear edge, and side walls 36 which extend forwardly from the rear wall 34 along the side edge of the bottom 32 to the front edge at the shaft 30. The bottom 32 of the door 28 is reinforced on its underside by a pair of laterally spaced inverted U-shaped channel members 38 welded thereto and extending in a front to rear direction.

The door 20 is provided with two latch means 40 each carried by a respective reinforcing member 38. Each latch means 40 has a latch 41 pivotally mounted on a shaft 42 extending between opposite walls 44, 46 of the reinforcing member. The latch 41 has rearwardly projecting upper and lower latch members 48, 50. The forward end of latch 41 is pivotally connected by a shaft 51 to one end of a rod 52 whose other end is slidably mounted in a mounting member 54. The mounting member 54 extends transversely between a pair of lugs 56 projecting downwardly from the reinforcing member walls 44, 46 near the front end of the door 28. A compressed coil spring 58 surrounds the rod 52 between the mounting member 54 and a stop in the form of a nut 60 near the latch 41.

FIG. 3 shows the latch 41 held in a door closing position by the sring 58. As will be described in more detail later, the latch 41 can be pivoted to a door opening position through a centre location in which the spring 58 is compressed to a maximum extent so that on passing the centre location the spring 58 snaps the latch 41 into the door open position. The threshing head 12 also has a pair of spaced latch keepers 62 mounted on a wall 64 extending downwardly from the front end of the concave 26. The manner in which the latches 41 cooperate with the latch keepers 62 will also be described in more detail later.

Door closing means 66 is connected between the door 28 and an axle 68 at the front end of the main body 16 of the harvester. The door closing means 66 comprises a sleeve 70 mounted for angular movement on a bracing bar 72 extending transversely across the threshing head 12 below the feeder 20. The sleeve 70 is connected to the door 28 by a pivot linkage including a first link 74 having one end rigidly connected to the sleeve 70 and the other end pivotally connected to one end of a second link 76, the other end of the second link 76 being pivotally connected to the mid point of the rear edge of the door 28. A flexible connecting member in the form of a chain 78 and coil spring 80 extends between the sleeve 70 and the shaft 68 in the main harvester body 16.

The door closing means 66 also includes catch means 80 comprising a rod-like catch member 82 slidably mounted in a bracker 84 secured to the bracing bar 72. A coil spring 86 surrounds the catch rod 82 and acts between the bracket 84 and a projection on the catch rod 82 to urge one end of the catch rod 82 into an aperture 88 in a lug 90 secured to the sleeve 70. A cable 92 extends from the other end of the catch rod 82 around a pulley 94 on the bracing bar 72 and extends rearwardly to the axle 68.

In normal operation of the harvester, the door 28 is held in a closed position (as shown in FIG. 1) by the two latch means 40, with the upper latch members 48 resting on the respective latch keepers 62 in the configuration indicated in FIG. 3, each latch 41 being retained in the closed position by the respective spring 58. Since the construction of the door 28 provides an upwardly open recess defined by the rear wall 34 and side walls 36, a number of small stones 95 propelled along the flow path of the crop by the feeder roll 20 can fall into the door recess, permitting the crop to proceed to the path between threshing cylinder 24 and the concave 26. It will be noted that the upper edge of rear door wall 34 is level with the front edge of the concave 26.

If a large stone 96 travels along the flow path with the crop, it will tend to jam between the cylinder 24 and the door 28. The resultant downward force on the door and consequent reaction between the latch keeper 62 and upper latch members 48 cause the latches 41 to rotate in a clockwise direction in FIG. 1 with compression of latch springs 58. When the latches 41 move past a straight line relationship with the rods 52, i.e. past a centre location, the springs 58 extend and force the latches 41 into the open position and the door 28 drops to the open position, as shown in FIG. 2, so that the stones 95, 96 fall to the ground. Opening of the door 28 causes the sleeve 70 to rotate to a position in which caatch rod 82 is urged by spring 86 to aperture 88 in lug 90 on sleeve 70.

To close the door 28, the operator simply has to stop the forward movement of the harvester and operate the conventional mechanism to raise the threshing head 12 to an upper position. Since the sleeve 70 is now prevented from rotation by catch rod 82, initial upward movement of the threshing head 12 causes tensioning of the spring 80. When the threshing head 12 reaches a predetermined upper position (defined by the length of cable 92), the cable 92 tensions and pulls catch rod 82 out of aperture 88 in sleeve lug 90. Sleeve tension spring 80 then rotates sleeve 70 and, with the resultant movement of links 74, 76, moves the door to the closed position. During the final closing movement, the lower latch members 50 engage the latch keepers 62, with resultant anticlockwise movement of the latches 41 causing the latches 41 to move through the centre location and snap back into the original closed configuration of FIG. 1, thereby holding the door in the closed position.

The simplicity and safety of operation of the present inventiion is therefore readily apparent from the foregoing description of the preferred embodiment. The length of cable 92 and of chain 78 can of course be readily adjusted to provide optimum performance.

Other embodiments of the invention will be readily apparent to a person skilled in the art, the scope of the invention being defined in the appended claims.

What we claim as new and desire to protect by Letters Patent of the United States is:

1. A harvester having a threshing head pivotally mounted at the front end for raising and lowering movement between a lower operative position and an upper inoperative position, said threshing head comprising a rotatable threshing cylinder, a concave adjacent to and spaced from the threshing cylinder, means for feeding crop along a flow path to the space between the threshing cylinder and the concave, a stone guard door in the flow path, latch means normally retaining the door in a closed position, and operable by a stone above a predetermined size to cause opening of the door and discharge of the stone from the flow path before the stone enters the space between the threshing cylinder and the concave, and door closing means connected between the door and the front end of the harvester and operable by movement of the threshing head to a raised position to effect closing of the door, said door closing means comprises spring means tensioned by initial raising movement of the threshing head, and catch means operable to prevent closing movement of the door during initial raising movement of the head and released by raising movement of the threshing head beyond an initial raised position to cause the door to be shut by energy provided by said tensioned spring means.

2. A harvester according to claim 1 wherein the door latch means comprises a pivoted latch member retainable by a latch spring in locking and unlocking positions and movable from one position through a centre location to the other position by application of a predetermined force to the door in an opening or closing direction when the door is closed or nearly closed respectively.

3. A harvester according to claim 1 wherein the door is recessed below the flow path so as to hold a number of smaller stones therein without the door being opened.

4. A harvester having a header pivotally mounted at the front end for raising and lowering movement between a lower operative position and an upper inoperative position, said head having means for feeding crop along a crop flow path, a stone guard door in the flow path, latch means normally for retaining door in a closed position and operable by passage of a stone above a predetermined size along the flow path to cause opening of the door and discharge of the stone from the flow path, and door closing means connected between the door and the front end of the harvester and operable by movement of the threshing head to a raised position to effect closing of the door, said door closing means comprises spring means tensioned by initial raising movement of the threshing head, and catch means operable to prevent closing movement of the door during initial raising movement of the head and released by raising movement of the threshing head beyond an initial raised position to cause the door to be shut by energy provided by said tensioned spring means.

5. A harvester according to claim 4 wherein the door latch means comprises a pivoted latch member retainble by a latch spring in locking and unlocking positions and movable from one position through a centre location to the other position by application of a predetermined force to the door in an opening or closing direction when the door is closed or nearly closed respectively.

6. A harvester according to claim 4 wherein the door is recessed below the flow path so as to hold a number of smaller stones therein without the door being opened.

* * * * *